(12) United States Patent
Zhou et al.

(10) Patent No.: US 12,149,864 B1
(45) Date of Patent: Nov. 19, 2024

(54) SYSTEMS AND METHODS FOR INCORPORATING AVATARS INTO REAL-TIME COMMUNICATION SESSIONS

(71) Applicant: Meta Platforms, Inc., Menlo Park, CA (US)

(72) Inventors: Zhuoping Zhou, Milpitas, CA (US); Brijesh Navin Chandra Patel, Union City, CA (US); Wing Mei Cheramie Cheung, Menlo Park, CA (US); Joel Alexander Bullard, Seattle, WA (US); Pablo Jose Barvo, Kirkland, WA (US); Philipp Ojha, Austin, TX (US); Shu Liang, Redwood City, CA (US); Graham Hill, Los Angeles, CA (US); Mahalia Katherine Miller, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 25 days.

(21) Appl. No.: 18/053,590

(22) Filed: Nov. 8, 2022

(51) Int. Cl.
*H04N 7/14* (2006.01)
*G06T 13/40* (2011.01)
*G06V 40/16* (2022.01)

(52) U.S. Cl.
CPC ............. *H04N 7/141* (2013.01); *G06T 13/40* (2013.01); *G06V 40/171* (2022.01); *G06V 2201/07* (2022.01)

(58) Field of Classification Search
CPC ....... H04N 7/141; G06V 40/171; G06T 13/40
See application file for complete search history.

(56) References Cited

U.S. PATENT DOCUMENTS

| | | | |
|---|---|---|---|
| 10,708,545 B2* | 7/2020 | Rivard | G06T 19/00 |
| 2016/0006987 A1* | 1/2016 | Li | G06V 40/174 |
| | | | 348/14.03 |
| 2022/0150285 A1* | 5/2022 | Okina | G06T 7/20 |
| 2023/0057073 A1* | 2/2023 | Walker | G06T 7/70 |
| 2023/0222721 A1* | 7/2023 | Chen | G06T 13/40 |
| | | | 345/419 |
| 2023/0344662 A1* | 10/2023 | Banks | H04N 7/147 |
| 2023/0368444 A1* | 11/2023 | Blackburne | H04L 65/1083 |

* cited by examiner

*Primary Examiner* — Olisa Anwah
(74) *Attorney, Agent, or Firm* — Greenberg Traurig, LLP

(57) ABSTRACT

The disclosed computer-implemented method may include systems for incorporating a user's avatar into a real-time communication session. For example, the described systems establish a real-time communication session between two or more social networking system users. The described systems further generate a landmark map representing positioning of one of the real-time communication session participants, and transmit the landmark map with the participant's avatar to one or more recipients. On the recipient-side, the described systems render the transmitted avatar according to the landmark map. Various other methods, systems, and computer-readable media are also disclosed.

20 Claims, 5 Drawing Sheets

SYSTEMS AND METHODS FOR INCORPORATING AVATARS INTO REAL-TIME COMMUNICATION SESSIONS

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
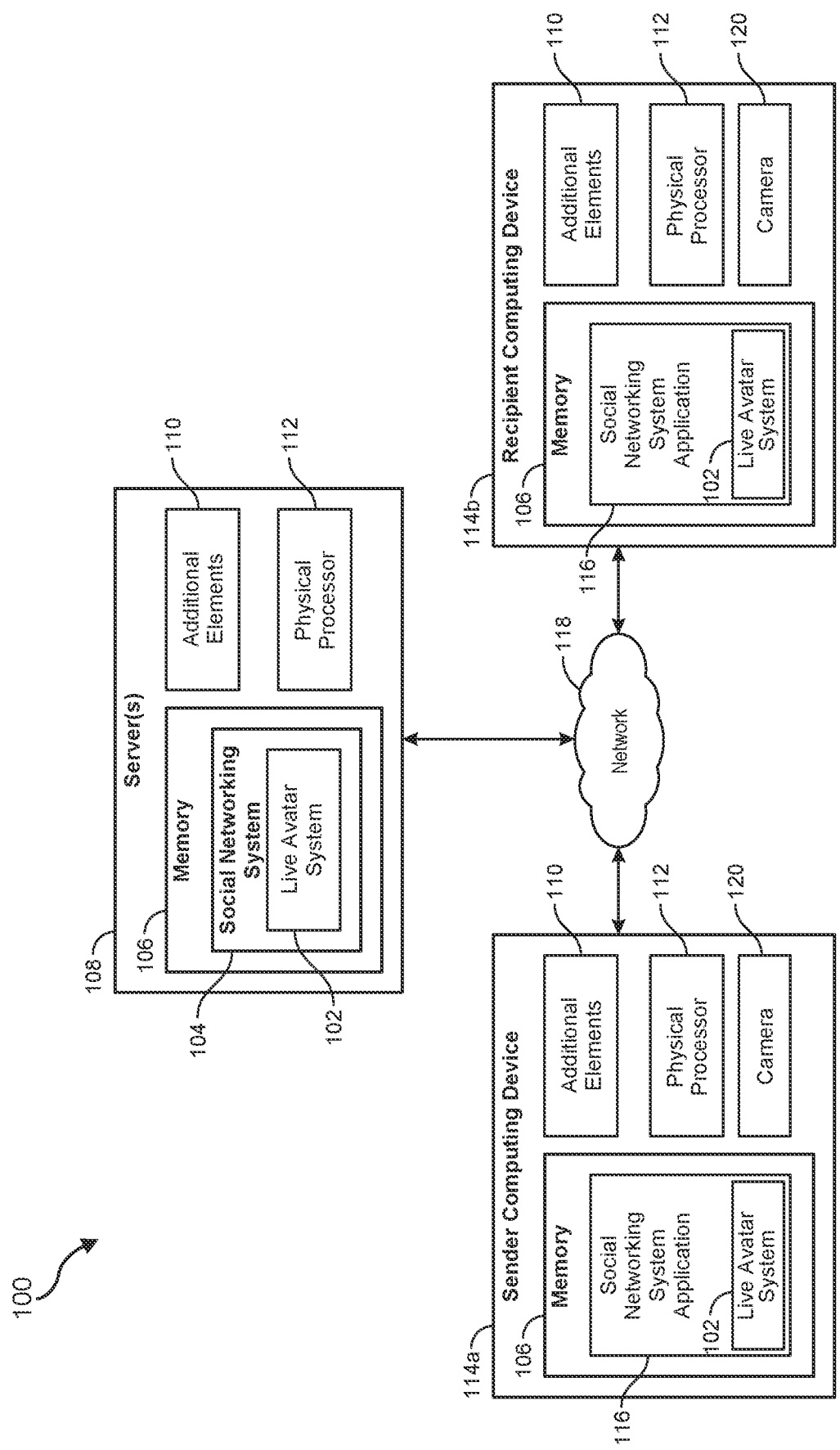
FIG. 1 is an overview diagram of an environment in which a live avatar system operates in accordance with one or more implementations.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

Social networking systems provide many ways for users to engage with each other. For example, many social networking systems enable users to compose posts and send electronic messages to friends. Some social networking systems can further stream live user-broadcasts from one user computing device that can be watched by other social networking system co-users. Some social networking systems also support video calling between users where callers can both see and hear each other during the video call.

Despite this, example social networking systems often fail to provide users with more creative and personal ways to engage with each other via real-time communication sessions like video calls. For example, some example social networking systems provide various augmented reality masks and games that users can implement during real-time communication session. These features, however, are not user-specific but are available generically to any social networking system user. Moreover, these additional features can utilize additional bandwidth potentially resulting in lags and freezes during the video call.

As such, the present disclosure describes implementations that can present a user's avatar in place of the user's live video stream during a real-time communication session. For example, the implementations described herein can generate a landmark map of a sender within a video call. The implementations described herein can further transmit the landmark map along with the sender's avatar to the recipient. In at least one implementation, the recipient computing device can render the sender's avatar according to the landmark map. In this way, the sender can appear as their avatar within the real-time communication session. Moreover, because the implementations described herein continuously update the landmark map according to the sender's physical movements, the sender's avatar can appear to move in realistic ways that mirror the sender in real life. Additionally, the implementations described herein can make the video call more efficient and less data-heavy because the avatar rendering happens on the recipient computing device.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
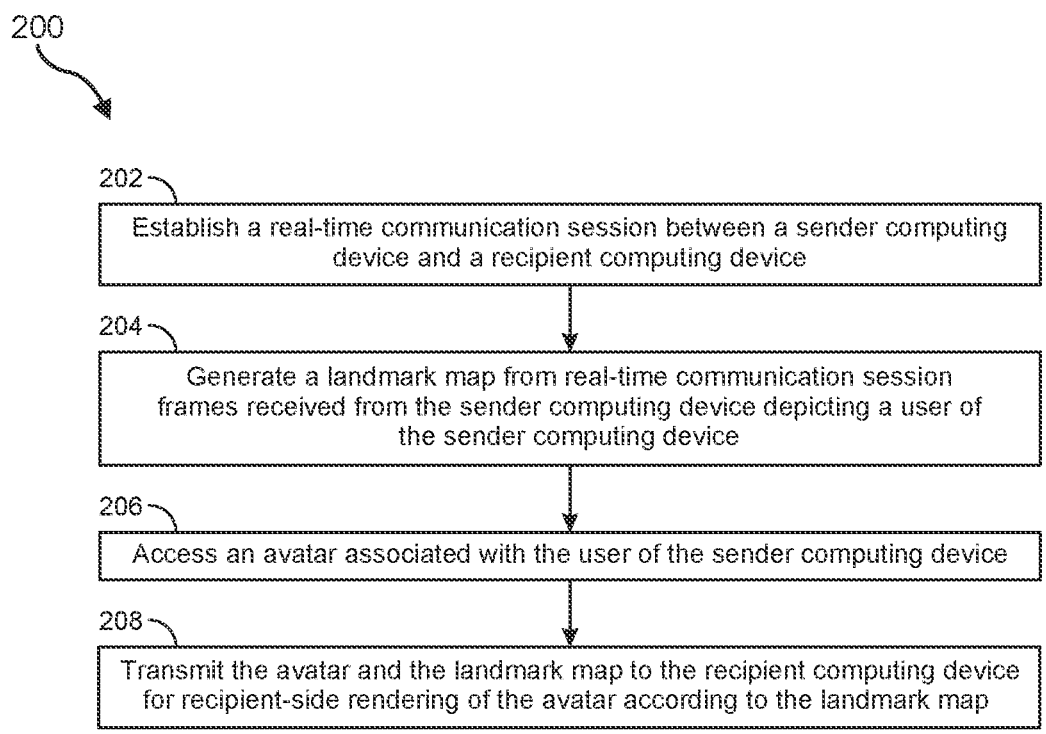
FIG. 2 is a flow diagram of an exemplary computer-implemented method for incorporating avatars into a real-time communication session in accordance with one or more implementations.
Figure 3B:
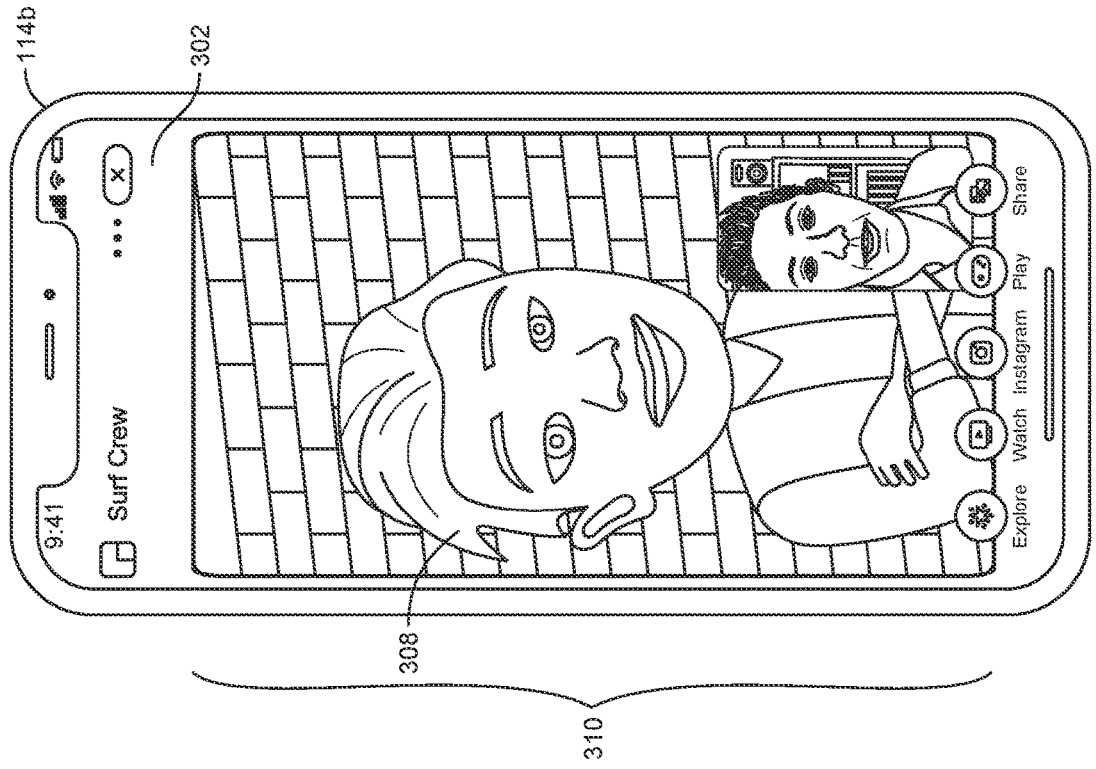
FIGS. 3A-3C illustrate example user interfaces and displays generated by the live avatar system in accordance with one or more implementations.
Figure 3A:
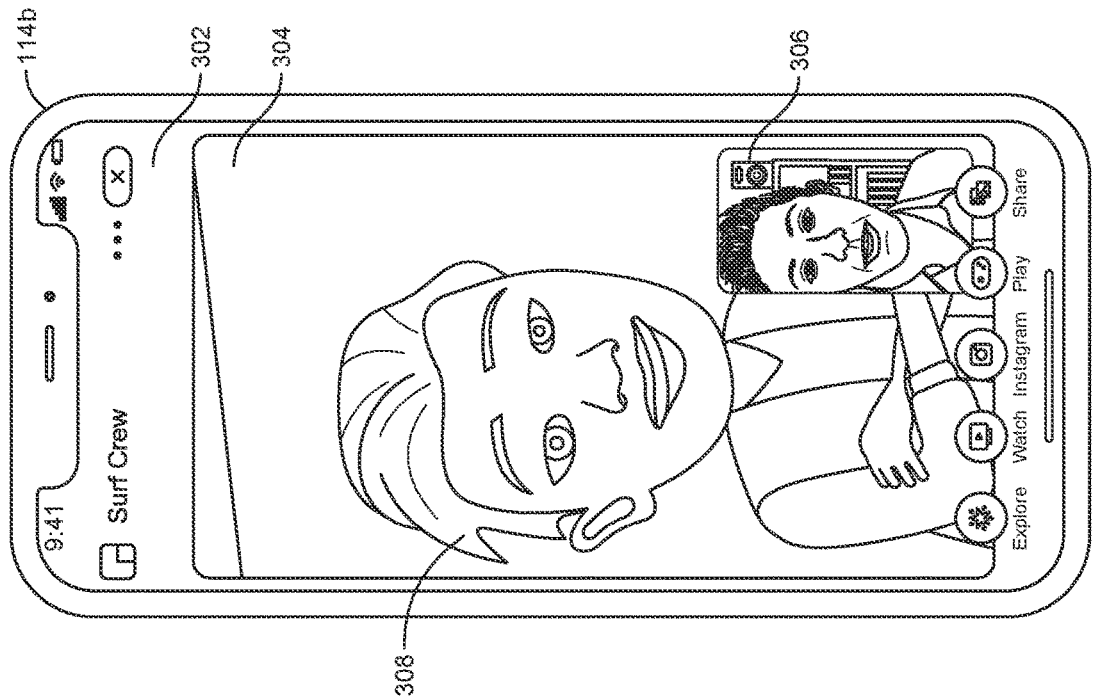
Figure 3C:
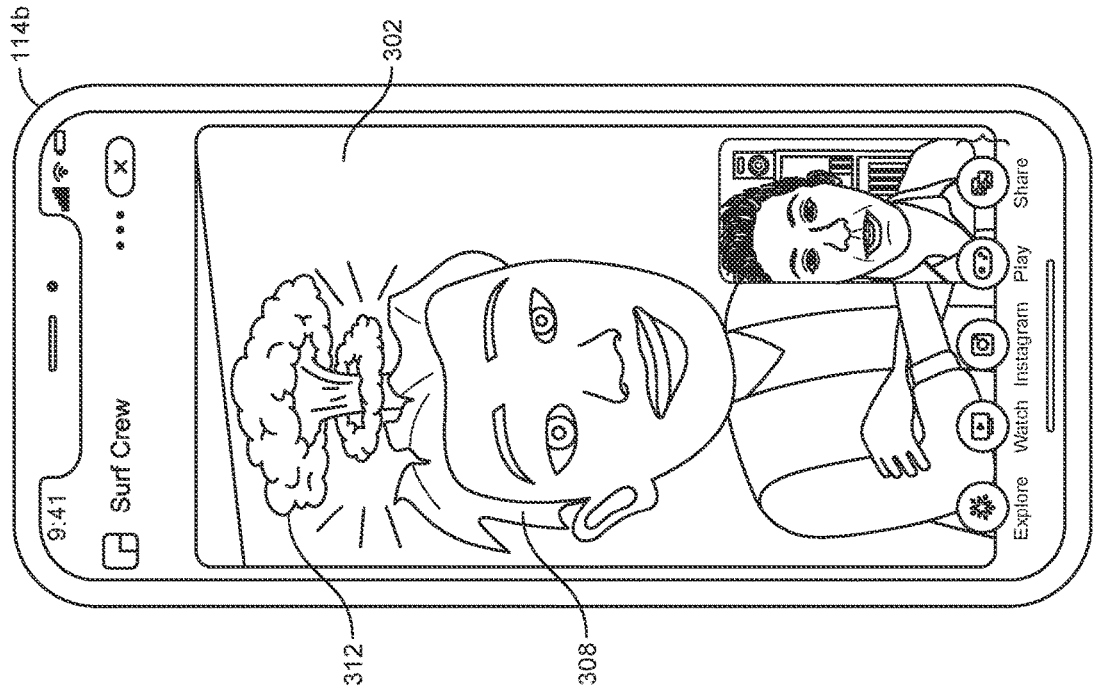
Figure 4:
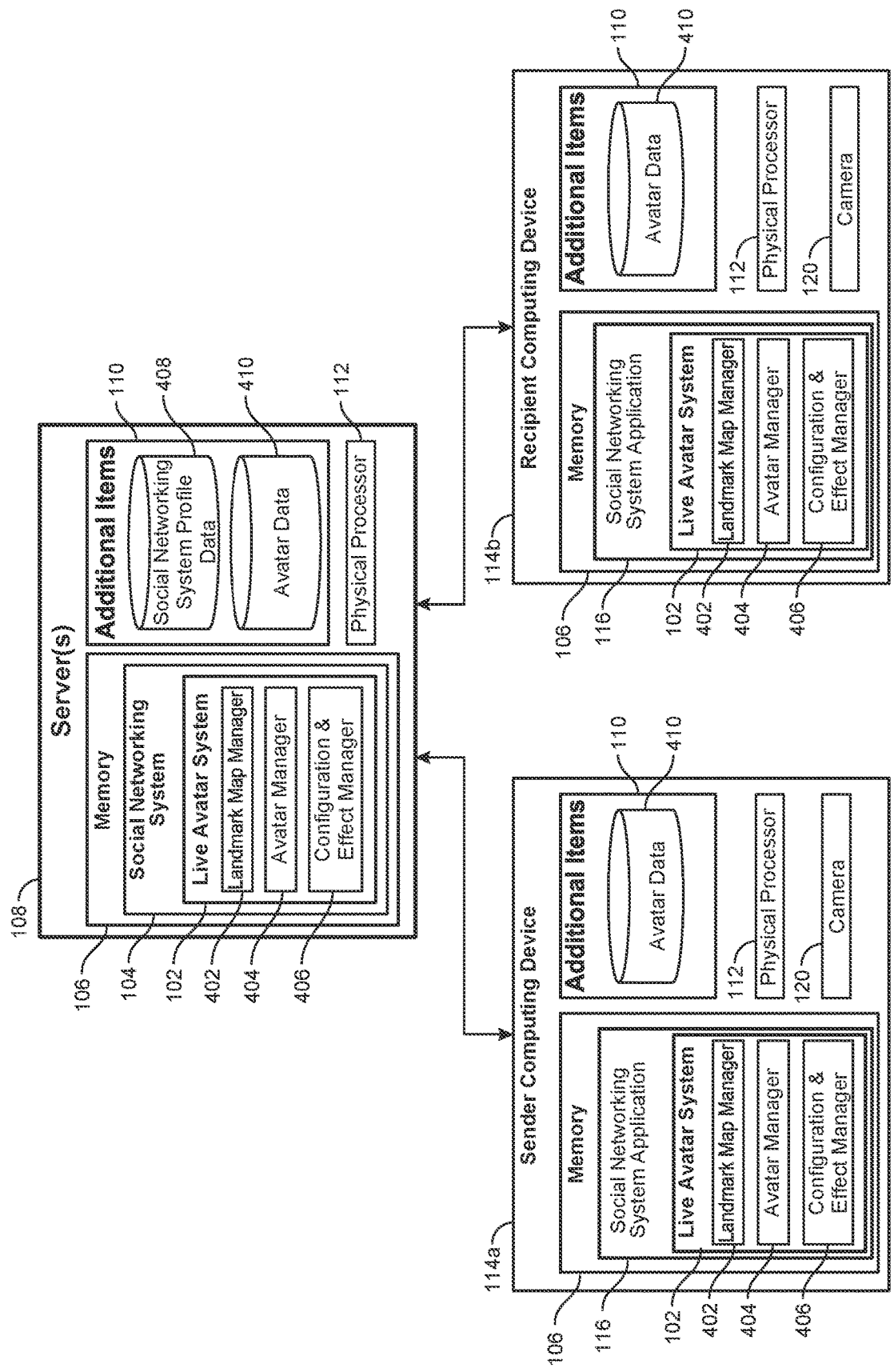
FIG. 4 is a detailed diagram of the live avatar system in accordance with one or more implementations.

The following will provide with reference to FIGS. 1-4, detailed descriptions of a live avatar system that replaces a sender's live stream with the sender's avatar during a real-time communication session. For example, FIG. 1 illustrates a networked environment where the live avatar system can operate from a central server, a sender computing device, and/or a recipient computing device. FIG. 2 further illustrates a flow diagram of steps taken by the live avatar system in incorporating an avatar into a real-time communication session. FIGS. 3A-3C show a real-time communication session interface including avatar displays generated by the live avatar system during a real-time communication session. FIG. 4 further illustrates an overview of the features and functionality of the live avatar system.

As just mentioned, FIG. 1 illustrates an exemplary networking environment 100 implementing aspects of the present disclosure. For example, the networking environment 100 can include server(s) 108, a sender computing device 114a, a recipient computing device 114b, and a network 118. As further shown, the server(s) 108, the sender computing device 114a, and the recipient computing device 114b can each include a memory 106, additional elements 110, and a physical processor 112. Additionally, each of the computing devices 114a, 114b can include a camera 120.

In at least one implementation, a live avatar system 102 is implemented as part of a social networking system 104, within the memory 106 of the server(s) 108. In some implementations, each of the sender computing device 114a and the recipient computing device 114b may also include a social networking system application 116 installed on the memories 106 thereon. As shown in FIG. 1, the sender computing device 114a, the recipient computing device 114b, and the server(s) 108 can communicate via the network 118 to send and receive real-time communication data.

As illustrated in FIG. 1, the sender computing device 114a and the recipient computing device 114b can include any type of user device suitable for real-time communication including, but not limited to, smart phones, smart wearables, laptop computers, desktop computers, tablet computers, video conferencing devices, and virtual reality devices. In one or more implementations, the sender computing device 114a and the recipient computing device 114b can also include the camera 120. The camera 120 can capture digital photographs and/or digital videos. The camera 120 can also provide a live stream of digital video frames to the social networking system application 116 for transmission during a real-time communication session.

As mentioned above, the live avatar system 102 can operate as part of the social networking system 104. In one or more implementations, the social networking system 104 can support real-time video communication sessions between co-users of the social networking system 104 (e.g., social networking system friends). Furthermore, as shown in FIG. 1, the live avatar system 102 can also operate as part of the social networking system application 116 installed on the sender computing device 114*a* and the recipient computing device 114*b*. In one or more implementations, and as discussed in greater detail below, the live avatar system 102 can generate a landmark map of a sender on the sender computing device 114*a*. Additionally, the live avatar system 102 can identify an avatar associated with the sender. Moreover, the live avatar system 102 on the recipient computing device 114*b* can render the sender's avatar according to the landmark map.

Furthermore, as shown in FIG. 1, the sender computing device 114*a* and the recipient computing device 114*b* can include the social networking system application 116. In one or more implementations, the social networking system application 116 transmits and receives data to and from the live avatar system 102 and/or the social networking system 104. In at least one implementation, the social networking system application 116 can transmit and receive real-time communication streams during a real-time communication session (e.g., a video chat).

As mentioned above, the sender computing device 114*a*, the recipient computing device 114*b*, and the server(s) 108 may be communicatively coupled through the network 118. The network 118 may represent any type or form of communication network, such as the Internet, and may include one or more physical connections, such as a LAN, and/or wireless connections, such as a WAN.

Although FIG. 1 illustrates components of the networking environment 100 in one arrangement, other arrangements are possible. For example, in one implementation, the live avatar system 102 and the social networking system 104 may exist across multiple networked servers or other computing devices. In another implementation, the live avatar system 102 may operate as a web browser plugin and/or an extension to the social networking system application 116. In additional implementations, the networking environment 100 may include any number of computing devices and/or servers. For example, the networking environment 100 can include multiple recipient computing devices.

Moreover, in one or more implementations, the sender computing device 114*a* may operate as a recipient computing device, and the recipient computing device 114*b* may operate as a sender computing device. For example, during a real-time communication session, the sender computing device 114*a* may also receive real-time communication session data from the recipient computing device 114*b*. Similarly, the recipient computing device 114*b* can send real-time communication session data to the sender computing device 114*a*. Thus, the live avatar system can incorporate the sender's avatar into the real-time communication session, or can incorporate the recipient's avatar into the real-time communication session, or can incorporate both the sender's and the recipient's avatars into the real-time communication session. For the purposes of illustrating the functionality of the live avatar system 102 here, the sender computing device 114*a* is described as originating data for incorporating an avatar into a real-time communication session that includes the recipient computing device 114*b*.

In one or more implementations, the methods and steps performed by the live avatar system 102 reference multiple terms. As used herein, a "real-time communication session" can refer to two or more media streams that are simultaneously transmitted through an intermediary to two or more session participant computing devices. For example, the social networking system 104 can receive media streams from session participant computing devices, and transmit the received media streams among the session participant computing devices. In some implementations, the social networking system 104 can format or edit a received media stream before transmitting that media stream to another session participant computing device.

As used herein, the term "frames" can refer to individual image captures within a digital video stream (e.g., a media stream). For example, and depending on the frame capture rate, a digital video stream can include multiple frames per second. Each frame may include a digital image and may correspond to a particular audio time stamp in an associated audio stream.

As used herein, an "avatar" can refer to a digital media item depicting a figure. In more detail, an avatar can include a digital figure that represents a user. Avatars can include features (e.g., eye color, hair color, skin tone, body shape) that mimic those of the user. Additionally, avatars can include features that do not mimic the user (e.g., wings, elf ears, claws). In some instances, an avatar can be humanoid. In other instances, an avatar may be non-human (e.g., a cat, a unicorn). An avatar can be rendered so as to appear three-dimensional on a typical computing device display. Moreover, an avatar can be rendered in three-dimensions within an augmented or virtual reality space. Avatars can be photo-realistic or can be cartoonish.

As used herein, a "landmark map" can refer to a listing of coordinates representing features identified within a digital video frame. For example, a landmark map can include x and y coordinates of features such as a user's body features and/or facial features identified within a digital video frame. Such body and/or facial features can include joints (e.g., shoulders, elbows, hips, knees, wrists, fingers, necks), a hairline, eyebrows, eyes, a nose, a mouth, a chin, ears, eyelids, and so forth.

As used herein, the term "real-time communication session configuration" can refer to data that modifies the appearance of a digital video stream during real-time communication session. For example, a real-time communication session configuration can modify a background shown in the digital video stream, a foreground shown in the digital video stream, a lighting source demonstrated by the digital video stream, and so forth.

As used herein, the term "real-time communication session effect" can refer to an additional media item inserted into a digital video stream. For example, a real-time communication session effect can include an item added to an avatar (e.g., clothing or held items like a pencil) or an item added to the background of the digital video stream (e.g., fireworks, rain drops). In some implementations, a real-time communication session effect can include an animation that incorporates the avatar (e.g., an animation that causes the avatar to do a double backflip).

As mentioned above, FIG. 2 is a flow diagram of an exemplary computer-implemented method 200 for replacing a sender's video stream with the sender's avatar during a real-time communication session. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the live avatar system 102 may establish a real-time communication session between a sender computing device and a recipient computing device. For example, the live avatar system 102 can establish the real-time communication session by receiving video streams from both the sender computing device and the recipient computing device, and providing the received video streams to the opposite computing device.

As further illustrated in FIG. 2, at step 204 the live avatar system 102 may further generate a landmark map from real-time communication session frames received from the sender computing device depicting a user of the sender computing device. For example, the live avatar system 102 can generate the landmark map by analyzing frames from the video stream from the sender computing device 114a to identify facial and body landmarks of the sender. Based on these landmarks, live avatar system 102 can determine frame-based coordinates (e.g., x and y coordinates), and add the frame-based coordinates to the landmark map. As such, for example, the landmark map can include coordinates within the frames of the video stream from the sender computing device 114a that correspond with facial and body features of the sender.

Additionally, at step 206 the live avatar system 102 can access an avatar associated with the user of the sender computing device. For example, the live avatar system 102 can identify a social networking system profile associated with the sender. The live avatar system 102 can further access the sender's avatar via the identified social networking system profile.

Furthermore, as shown in FIG. 2, at step 208 the live avatar system 102 can transmit the avatar and the landmark map to the recipient computing device for recipient-side rendering of the avatar according to the landmark map. For example, the live avatar system 102 can transmit the sender's avatar and the landmark map indicating the positioning of the sender within the video stream from the sender computing device 114a. At the recipient computing device 114b, the live avatar system 102 can render the sender's avatar according to the landmark map so that the recipient computing device 114b displays the avatar with positioning that mirrors the sender's physical positioning.

As discussed above, the live avatar system 102 enables the use of avatars during real-time communication sessions such as video chats. FIGS. 3A-3C illustrate a series of displays within a real-time communication session user interface generated by the live avatar system 102 during a real-time communication session that include a sender's avatar in place of the video stream from the sender computing device 114a.

For example, as shown in FIG. 3A, the social networking system 104 can generate a real-time communication session user interface 302 on the recipient computing device 114b in response to establishing a real-time communication session between the sender computing device 114a and the recipient computing device 114b. In one or more implementations, the social networking system 104 can generate the real-time communication session user interface 302 including a sender display 304 and a recipient display 306. Generally, the social networking system 104 generates the sender display 304 including the live video stream from the sender computing device 114a (e.g., showing the sender). Similarly, the social networking system 104 can generate the recipient display 306 including the live video stream from the recipient computing device 114b (e.g., showing the recipient).

In at least one implementation, however, the live avatar system 102 can replace the live video stream from the sender computing device 114a with an avatar display. For example, as shown in FIG. 3A, the live avatar system 102 on the recipient computing device 114b can render the sender's avatar 308 within the sender display 304. As mentioned above, and as described in greater detail below with regard to FIG. 4, the live avatar system 102 can render the sender's avatar 308 on the recipient computing device 114b in response to receiving the avatar 308 and a landmark map associated with the sender. For example, the live avatar system 102 installed on the recipient computing device 114b can render the sender's avatar 308 within the sender display 304 according to the landmark map.

In one or more implementations, the live avatar system 102 can render the avatar 308 with additional real-time communication session configurations and/or real-time communication session effects. To illustrate, FIG. 3B shows a real-time communication session configuration 310 rendered by the live avatar system 102 in addition to the avatar 308 within the real-time communication session user interface 302. For example, in response to a detected selection via the social networking system application 116 on the sender computing device 114a, the live avatar system 102 can generate the real-time communication session configuration 310 including a particular background (e.g., a brick wall background).

Additionally, as shown in FIG. 3C, the live avatar system 102 can render a real-time communication session effect 312 in connection with the avatar 308 within the real-time communication session user interface 302. For example, in response to a detected selection of one or more effects from the sender computing device 114a, the live avatar system 102 can identify display instructions associated with the selected effect. The live avatar system 102 can further render the real-time communication session effect 312 according to the identified display instructions. To illustrate, the identified display instructions may instruct the live avatar system 102 on the recipient computing device 114b to pause rendering the avatar 308 according to the landmark map in favor of rendering the avatar 308 according to the display instructions. The display instructions may further instruct the live avatar system 102 to insert one or more items (e.g., images, animations) into the real-time communication session user interface 302 with the avatar 308. For example, as shown in FIG. 3C, the display instructions may instruct the live avatar system 102 to insert an explosion animation above the head of the avatar 308.

In one or more implementations, the live avatar system 102 can incorporate avatars into a real-time communication session in response to various events. For example, the live avatar system 102 can incorporate the sender's avatar in response to a detected selection of an avatar option on the sender computing device 114a following initiation of the real-time communication session. In another implementation, the live avatar system 102 can receive a detected selection of the avatar option prior to initiating the real-time communication session-meaning that the live avatar system 102 can initiate the real-time communication session already showing the avatar rather than the digital video stream from the sender computing device 114a. In some implementations, the live avatar system 102 can provide an option to toggle the avatar on and off during the real-time communication session, thereby switching back and forth between the digital video stream from the sender computing device 114a and the avatar display.

In one or more implementations, the live avatar system 102 can provide the avatar display only on the recipient computing device 114b such as shown in FIGS. 3A-3C. In additional implementations, the live avatar system 102 can provide the avatar display on both the recipient computing device 114b and on the sender computing device 114a. In this way, the sender can also see their avatar as the recipient is seeing it.

Although the live avatar system 102 is described herein as performing recipient-side rendering of the avatar, other implementations are possible. For example, the live avatar system 102 can render the avatar display on the server(s) 108 according to the landmark map. Additionally, in at least one implementation, the live avatar system 102 can render the avatar display according to the landmark map at the sender computing device 114a.

Moreover, in some implementations, the live avatar system 102 can incorporate avatars into one-sided real-time communications. For example, in one implementation, the live avatar system 102 can generate an avatar display during capture of a video message. To illustrate, if the recipient is not available to participate in a real-time communication session with the sender, the live avatar system 102 can enable the sender to leave a video message for the recipient. During capture of the video message, the live avatar system 102 can generate landmark maps of the sender's physical movements, and render the sender's avatar within the captured video according to the generated landmark maps. The live avatar system 102 may then package the video message for playback and make the video message available for viewing by the recipient computing device 114b.

As mentioned above, the live avatar system 102 performs various functions in connection with incorporating avatars into real-time communication sessions. FIG. 4 is a block diagram 400 of the live avatar system 102 operating within the social networking system 104 on the server(s) 108, and within the social networking system application 116 on the sender computing device 114a and the recipient computing device 114b, while performing these functions. As such, FIG. 4 provides additional detail with regard to these functions. For example, as shown in FIG. 4, the live avatar system 102 can include a landmark map manager 402, an avatar manager 404, and a configuration and effect manager 406. Moreover, the additional elements 110 on the server(s) can include social networking system profile data 408 and avatar data 410, while the additional elements 110 on the sender computing device 114a and the recipient computing device 114b can include avatar data 410.

In certain implementations, the live avatar system 102 may represent one or more software applications or programs that, when executed by a computing device, may cause the computing device to perform one or more tasks. For example, and as will be described in greater detail below, one or more of the landmark map manager 402, the avatar manager 404, or the configuration and effect manager 406 of the live avatar system 102 may represent software stored and configured to run on one or more computing devices, such as the server(s) 108. One or more of the landmark map manager 402, avatar manager 404, configuration and effect manager 406 of the live avatar system 102 shown in FIG. 4 may also represent all or portions of one or more special purpose computers to perform one or more tasks.

As mentioned above, and as shown in FIG. 4, the live avatar system 102 can include the landmark map manager 402. In one or more implementations, the landmark map manager 402 generates landmark maps representing body and facial features of a sender. For example, the landmark map manager 402 can generate a landmark map of a sender (e.g., the user of the sender computing device 114a) by first identifying body and facial features of the sender within one or more frames from the live video stream transmitted from the sender computing device 114a. To illustrate, the landmark map manager 402 can identify body features such as, but not limited to, shoulders, elbows, hands, a waist, a neck, a head, legs, and feet. The landmark map manager 402 can further identify facial features such as, but not limited to, a chin, a mouth, ears, eyes, eyebrows, a nose, and a hairline.

In one or more implementations, the landmark map manager 402 can further generate the landmark map by determining coordinates associated with the identified features. For example, the landmark map manager 402 can generate a coordinate system based on the boundaries of the analyzed frame to determine X and Y coordinates for each identified feature. As such, in at least one implementation, the landmark map manager 402 generates the landmark map as a listing of coordinates.

In one or more implementations, the landmark map manager 402 can generate the landmark map utilizing a machine learning model that is trained to identify body and/or facial features. To demonstrate, the landmark map manager 402 can input a digital video frame from the digital video stream of the sender computing device 114a into the machine learning model. In at least one implementation, the machine learning model can output one or more coordinates representing a location of the features identified in the digital video frame.

The landmark map manager 402 can generate the listing of coordinates in a predetermined order such that the landmark map can be read in an expected order. To illustrate, the landmark map manager 402 may generate the landmark map with coordinates of facial features first, starting with hairline coordinates followed by eyebrow coordinates, eye coordinates, nose coordinates, and so forth. The landmark map manager 402 may further generate the landmark map with coordinates of body features, starting with head coordinates followed by neck coordinates, shoulder coordinates, elbow coordinates, etc. The landmark map manager 402 may generate the landmark map in any format including, but not limited to a comma-separated values list, a table, a linked list, etc.

In one or more implementations, the landmark map manager 402 can generate a landmark map of the sender at regular intervals. For example, the landmark map manager 402 can generate a landmark map every second. In additional implementations, the landmark map manager 402 can generate a landmark map every ten frames. The landmark map manager 402 may continue to regularly generate landmark maps until either the real-time communication session ends, or until the live avatar system 102 detects a user interaction from the sender computing device 114a that toggles-off the avatar feature.

As further mentioned above, and as shown in FIG. 4, the live avatar system 102 can include the avatar manager 404. In one or more implementations, the avatar manager 404 can perform different tasks depending on where it is implemented. For example, when implemented as part of the live avatar system 102 on the server(s) 108, the avatar manager 404 can identify an avatar associated with the sender. To illustrate, in response to a detected selection that activates the avatar feature on the sender computing device 114a, the avatar manager 404 can identify a social networking system profile associated with the sender (e.g., the user of the sender computing device 114a) within the social networking system profile data 408. From the sender's social networking system profile, the avatar manager 404 can further identify an avatar in the avatar data 410 that corresponds with the sender's social networking system profile.

When implemented on the sender computing device 114a and the recipient computing device 114b, the avatar manager 404 can render the identified avatar. For example, the avatar manager 404 can render the sender's avatar according to the landmark map generated relative to the sender's physical appearance in the video stream from the sender computing device 114a. To illustrate, the avatar manager 404 can render the avatar according to the landmark map by pinning features of the avatar to coordinates within the sender display 304 that mirror those of the sender. For instance, the avatar manager 404 can identify coordinates for the sender's shoulders in the landmark map, and then can pin or position the avatar's shoulders to those coordinates within the sender display 304. The avatar manager 404 can re-render the avatar within the sender display 304 each time an updated landmark map is received. As mentioned above, the avatar manager 404 can also render the avatar at the server(s) 108 or at the sender computing device 114a.

In one or more implementations, the avatar manager 404 can further render the avatar based on predicted movements. For instance, the avatar manager 404 can use machine learning to predict movement of the avatar and re-render the avatar based on the prediction in order to avoid jerky avatar movement and to make the movement of the avatar appear more lifelike. Additionally, the avatar manager 404 can render the avatar including standard or expected motions that may not be accurately captured by the generated landmark maps (e.g., eye blinks, natural eyeline movement).

In at least one implementation, the avatar manager 404 can render the avatar according to the landmark map on both of the sender computing device 114a and the recipient computing device 114b. For example, the avatar manager 404 can render the avatar on the sender computing device 114a so that the sender can be aware of how the avatar appears to the recipient. Alternatively, the avatar manager 404 may only render the avatar on the recipient computing device 114b. In that implementation, the live avatar system 102 ensures that very little extra data is added to the real-time communication session. For example, by only transmitting the sender's avatar and landmark map to the recipient computing device 114b, the live avatar system 102 transmits less data to the recipient computing device 114b than would be transmitted in a standard video call. As such, the live avatar system 102 introduces almost no lag to the real-time communication session, even though the sender is being visually represented to the recipient in a life-like way.

Additionally, as shown in FIG. 4, the live avatar system 102 can include the configuration and effect manager 406. In one or more implementations, the configuration and effect manager 406 can render additional configurations and effects into the sender display 304 on the recipient computing device 114b and/or into the recipient display 306 on the sender computing device 114a. For example, the configuration and effect manager 406 can render various configurations such as, but not limited to, background content, foreground content, articles of clothing worn by the avatar, items being held by the avatar, and so forth. In at least one implementation, the configuration and effect manager 406 can also render configurations that are associated with files selected by the sender via the sender computing device 114a. For example, the configuration and effect manager 406 can render a background including a presentation file selected by the sender. In that implementation, the sender's avatar can appear to the recipient to be interacting with the displayed presentation during the real-time communication session.

Moreover, the configuration and effect manager 406 can identify and render various effects in connection with the sender's avatar during the real-time communication session. For example, in response to a detected selection of a real-time communication session effect from the sender computing device 114a, the configuration and effect manager 406 can identify display instructions for the selected effect (e.g., either on the server(s) 108 or the recipient computing device 114b) and render the effect according to the display instructions. To illustrate, the display instructions may be for the configuration and effect manager 406 to pause rendering the sender's avatar according to the landmark maps and instead to render the sender's avatar as part of a particular animation (e.g., the avatar doing a cartwheel). In this way, the configuration and effect manager 406 can make the sender's avatar appear like its head is exploding, it is freezing into an ice block, it is on fire, it is doing backflips, etc. Upon determining that the animation is complete, the configuration and effect manager 406 can again allow the avatar manager 404 to re-render the sender's avatar according to the most recent landmark map.

In some implementations, the configuration and effect manager 406 can enable the creation of custom real-time communication session effects. For example, the configuration and effect manager 406 can provide one or more interfaces through which the avatar sender can configure a sequence of actions for the avatar to perform during a real-time communication session effect. The configuration and effect manager 406 can then generate display instructions based on the sender's configurations.

As shown in FIGS. 1 and 4, the server(s) 108, the sender computing device 114a, and the recipient computing device 114b can include one or more physical processors, such as the physical processor 112. The physical processor 112 generally represents any type or form of hardware-implemented processing unit capable of interpreting and/or executing computer-readable instructions. In one implementation, the physical processor 112 may access and/or modify one or more of the components of the live avatar system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 108, the sender computing device 114a, and the recipient computing device 114b can include the memory 106. In one or more implementations, the memory 106 generally represents any type or form of volatile or non-volatile storage device or medium capable of storing data and/or computer-readable instructions. In one example, the memory 106 may store, load, and/or maintain one or more of the components of the live avatar system 102. Examples of the memory 106 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 108, the sender computing device 114a, and the recipient computing device 114b can include additional elements 110. On the server(s) 108, the additional elements 110 can include social networking system profile data 408 and the avatar data 410. In one or more implementations, the social networking system profile data 408 can include information associated with social networking system users' profiles. For example, social networking system profile data 408 can include social networking system activity history, account data, demographic data, and avatar data. That avatar data can point to a particular avatar stored in the avatar data 410. For example, the avatar data 410 can include configurations for avatars associated with social networking system users. These configurations can be associated with avatar appearance and avatar usage. Additionally, on the sender computing device 114a and the recipient computing device 114b the avatar data 410 can include avatar use history, and information associated with avatars that are displayed as part of real-time communication sessions.

In summary, the live avatar system 102 may provide a flexible and efficient way for users to engage with real-time communication session sessions. The live avatar system 102 may also provide an effective way for social networking system users to be seen in real-time communication sessions even when they have poor connectivity because the live avatar system 102 may only transmit the sender's audio and landmark maps for the sender's avatar to be generated on the recipient-side. In this way, the live avatar system 102 may improve on example real-time communication systems since it may provide a new way for users to experience and be seen in video chats.

Example Implementations

Example 1: A computer-implemented method for incorporating avatars into real-time communication sessions. For example, the method may include establishing a real-time communication session between a sender computing device and a recipient computing device, generating a landmark map from real-time communication session frames received from the sender computing device depicting a user of the sender computing device, accessing an avatar associated with the user of the sender computing device, and transmitting the avatar and the landmark map to the recipient computing device for recipient-side rendering of the avatar according to the landmark map.

Example 2: The computer-implemented method of Example 1, wherein generating the landmark map and accessing the avatar associated with the user of the sender computing device are in response to a detected selection of an avatar option from the sender computing device.

Example 3: The computer-implemented method of any of Examples 1 and 2, wherein generating the landmark map includes detecting one or more body features and facial features of the user of the sender computing device depicted in the real-time communication session frames, generating coordinates of the one or more body features and facial features, and generating the landmark map based on the coordinates.

Example 4: The computer-implemented method of any of Examples 1-3, wherein accessing the avatar associated with the user of the sender computing device includes identifying a social networking system profile associated with the user of the sender computing device, and accessing an avatar associated with the social networking system profile.

Example 5: The computer-implemented method of any of Examples 1-4, further including receiving additional real-time communication session frames from the sender computing device, generating an updated landmark map from the additional real-time communication session frames, and transmitting the updated landmark map to the recipient computing device to update the recipient-side rendering of the avatar.

Example 6: The computer-implemented method of any of Examples 1-5, further including detecting a real-time communication session configuration from the sender computing device, and transmitting the real-time communication session configuration to the recipient computing device to update the recipient-side rendering of the real-time communication session according to the real-time communication session configuration.

Example 7: The computer-implemented method of any of Examples 1-6, further including detecting a selection of a real-time communication session effect from the sender computing device, accessing display instructions associated with the real-time communication session effect, and transmitting the display instructions to the recipient computing device for recipient-side rendering of the real-time communication session effect within the real-time communication session.

In some examples, a system may include at least one processor and a physical memory including computer-executable instructions that, when executed by the at least one processor, cause the at least one processor to perform various acts. For example, the computer-executable instructions may cause the at least one processor to perform acts including establishing a real-time communication session between a sender computing device and a recipient computing device, generating a landmark map from real-time communication session frames received from the sender computing device depicting a user of the sender computing device, accessing an avatar associated with the user of the sender computing device, and transmitting the avatar and the landmark map to the recipient computing device for recipient-side rendering of the avatar according to the landmark map.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to establish a real-time communication session between a sender computing device and a recipient computing device, generate a landmark map from real-time communication session frames received from the sender computing device depicting a user of the sender computing device, access an avatar associated with the user of the sender computing device, and transmit the avatar and the landmark map to the recipient computing device for recipient-side rendering of the avatar according to the landmark map.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   establishing a real-time communication session between a sender computing device and a recipient computing device;
   generating a landmark map from real-time communication session frames received from the sender computing device depicting a user of the sender computing device;
   replacing the received real-time communication session frames with the landmark map, wherein the landmark map lacks data capturing standard motions captured in the real-time communication session frames;
   accessing an avatar associated with the user of the sender computing device; and
   transmitting the avatar and the landmark map to the recipient computing device for recipient-side rendering of the avatar according to the landmark map and predicted movements corresponding to the standard motions.

2. The computer-implemented method of claim 1, wherein generating the landmark map and accessing the avatar associated with the user of the sender computing device are in response to a detected selection of an avatar option from the sender computing device.

3. The computer-implemented method of claim 1, wherein generating the landmark map comprises:
   detecting one or more body features and facial features of the user of the sender computing device depicted in the real-time communication session frames;
   generating coordinates of the one or more body features and facial features; and
   generating the landmark map based on the coordinates.

4. The computer-implemented method of claim 1, wherein accessing the avatar associated with the user of the sender computing device comprises:
   identifying a social networking system profile associated with the user of the sender computing device; and
   accessing an avatar associated with the social networking system profile.

5. The computer-implemented method of claim 1, further comprising:
   receiving additional real-time communication session frames from the sender computing device;
   generating an updated landmark map from the additional real-time communication session frames; and
   transmitting the updated landmark map to the recipient computing device to update the recipient-side rendering of the avatar.

6. The computer-implemented method of claim 1, further comprising:
   detecting a real-time communication session configuration from the sender computing device; and
   transmitting the real-time communication session configuration to the recipient computing device to update the recipient-side rendering of the real-time communication session according to the real-time communication session configuration.

7. The computer-implemented method of claim 1, further comprising:
detecting a selection of a real-time communication session effect from the sender computing device;
accessing display instructions associated with the real-time communication session effect; and
transmitting the display instructions to the recipient computing device for recipient-side rendering of the real-time communication session effect within the real-time communication session.

8. A system comprising:
at least one physical processor; and
physical memory comprising computer-executable instructions that, when executed by the at least one physical processor, cause the at least one physical processor to perform acts comprising:
establishing a real-time communication session between a sender computing device and a recipient computing device;
generating a landmark map from real-time communication session frames received from the sender computing device depicting a user of the sender computing device;
replacing the received real-time communication session frames with the landmark map, wherein the landmark map lacks data capturing standard motions captured in the real-time communication session frames;
accessing an avatar associated with the user of the sender computing device; and
transmitting the avatar and the landmark map to the recipient computing device for recipient-side rendering of the avatar according to the landmark map and predicted movements corresponding to the standard motions.

9. The system of claim 8, wherein generating the landmark map and accessing the avatar associated with the user of the sender computing device are in response to a detected selection of an avatar option from the sender computing device.

10. The system of claim 8, wherein generating the landmark map comprises:
detecting one or more body features and facial features of the user of the sender computing device depicted in the real-time communication session frames;
generating coordinates of the one or more body features and facial features; and
generating the landmark map based on the coordinates.

11. The system of claim 8, wherein accessing the avatar associated with the user of the sender computing device comprises:
identifying a social networking system profile associated with the user of the sender computing device; and
accessing an avatar associated with the social networking system profile.

12. The system of claim 8, wherein the computer-executable instructions further comprise:
receiving additional real-time communication session frames from the sender computing device;
generating an updated landmark map from the additional real-time communication session frames; and
transmitting the updated landmark map to the recipient computing device to update the recipient-side rendering of the avatar.

13. The system of claim 8, wherein the computer-executable instructions further comprise:
detecting a real-time communication session configuration from the sender computing device; and
transmitting the real-time communication session configuration to the recipient computing device to update the recipient-side rendering of the real-time communication session according to the real-time communication session configuration.

14. The system of claim 8, wherein the computer-executable instructions further comprise:
detecting a selection of a real-time communication session effect from the sender computing device;
accessing display instructions associated with the real-time communication session effect; and
transmitting the display instructions to the recipient computing device for recipient-side rendering of the real-time communication session effect within the real-time communication session.

15. A non-transitory computer-readable medium comprising one or more computer-executable instructions that, when executed by at least one processor of a computing device, cause the computing device to:
establish a real-time communication session between a sender computing device and a recipient computing device;
generate a landmark map from real-time communication session frames received from the sender computing device depicting a user of the sender computing device;
replace the received real-time communication session frames with the landmark map, wherein the landmark map lacks data capturing standard motions captured in the real-time communication session frames;
access an avatar associated with the user of the sender computing device; and
transmit the avatar and the landmark map to the recipient computing device for recipient-side rendering of the avatar according to the landmark map and predicted movements corresponding to the standard motions.

16. The non-transitory computer-readable medium of claim 15, wherein the computer-executable instructions cause the computing device to generate the landmark map by:
detecting one or more body features and facial features of the user of the sender computing device depicted in the real-time communication session frames;
generating coordinates of the one or more body features and facial features; and
generating the landmark map based on the coordinates.

17. The non-transitory computer-readable medium of claim 15, wherein the computer-executable instructions cause the computing device to access the avatar associated with the user of the sender computing device by:
identifying a social networking system profile associated with the user of the sender computing device; and
accessing an avatar associated with the social networking system profile.

18. The non-transitory computer-readable medium of claim 15, wherein the computer-executable instructions, when executed by the at least one processor of the computing device, further cause the computing device to:
receive additional real-time communication session frames from the sender computing device;
generate an updated landmark map from the additional real-time communication session frames; and transmit the updated landmark map to the recipient computing device to update the recipient-side rendering of the avatar.

19. The non-transitory computer-readable medium of claim 15, wherein the computer-executable instructions, when executed by the at least one processor of the computing device, further cause the computing device to:
   detect a real-time communication session configuration from the sender computing device; and
   transmit the real-time communication session configuration to the recipient computing device to update the recipient-side rendering of the real-time communication session according to the real-time communication session configuration.

20. The non-transitory computer-readable medium of claim 15, wherein the computer-executable instructions, when executed by the at least one processor of the computing device, further cause the computing device to:
   detecting a selection of a real-time communication session effect from the sender computing device;
   accessing display instructions associated with the real-time communication session effect; and
   transmitting the display instructions to the recipient computing device for recipient-side rendering of the real-time communication session effect within the real-time communication session.

* * * * *